(12) United States Patent
Goetz et al.

(10) Patent No.: US 8,930,765 B2
(45) Date of Patent: Jan. 6, 2015

(54) SYSTEMS AND METHODS FOR FEEDBACK DRIVEN REGRESSION TESTING

(75) Inventors: Brian Goetz, Williston, VT (US); Maurizio Cimadamore, Donabate (IE)

(73) Assignee: Oracle International Corporation, Redwood City, CA (US)

( * ) Notice: Subject to any disclaimer, the term of this patent is extended or adjusted under 35 U.S.C. 154(b) by 150 days.

(21) Appl. No.: 13/563,026

(22) Filed: Jul. 31, 2012

(65) Prior Publication Data

US 2014/0040666 A1     Feb. 6, 2014

(51) Int. Cl.
  *G06F 11/28*   (2006.01)
(52) U.S. Cl.
  USPC ........................................ 714/38.1
(58) Field of Classification Search
  CPC ............ G06F 11/3672; G06F 11/3684; G06F 11/3604; G06F 11/3668; G06F 11/3624; G06F 11/366; G06F 8/70; G01R 31/3183

USPC ........................................ 714/1–57
  See application file for complete search history.

(56) References Cited

U.S. PATENT DOCUMENTS

| | | | |
|---|---|---|---|
| 5,754,860 A * | 5/1998 | McKeeman et al. ........... | 717/124 |
| 7,712,089 B2 * | 5/2010 | Opem et al. ................. | 717/140 |
| 8,434,058 B1 * | 4/2013 | Hudgons et al. .............. | 717/106 |
| 2008/0168426 A1 * | 7/2008 | Mitran et al. ................. | 717/126 |
| 2008/0256393 A1 * | 10/2008 | Ur .................................. | 714/38 |
| 2014/0040872 A1 * | 2/2014 | Goetz et al. ................... | 717/158 |

* cited by examiner

*Primary Examiner* — Nadeem Iqbal
(74) *Attorney, Agent, or Firm* — Polsinelli PC

(57) ABSTRACT

Systems and methods for automatically testing one or more versions of a compiler of are disclosed. A compiler is instrumented to generated data exposing various internal decisions and/or actions made by the compiler. Subsequently, multiple distinct versions of the compiler are executed to compile a code corpus associated with a particular programming language. Output (including instrumentation output) from the compilation of the code corpus for each version of the compiler is obtained and compared to identify behavioral changes that may exist between the various versions of the compiler.

20 Claims, 3 Drawing Sheets

SYSTEMS AND METHODS FOR FEEDBACK DRIVEN REGRESSION TESTING

RELATED APPLICATIONS

The present non-provisional utility is related to co-pending non-provisional utility application Ser. No. 13/562,915 titled "Systems And Methods For Testing A Compiler Through Compile-Time Decision Feedback," filed on Jul. 31, 2012, which is hereby incorporated by reference in its entirety herein.

TECHNICAL FIELD

Aspects of the present disclosure relate to software compilers, and more particularly, testing software compilers.

BACKGROUND

A compiler is a type of computer program (or set of programs) that transforms source code written in a programming language (the source language) into another computer language (the target language) to create executable programs that will run accurately on some form of computing device. During compilation of the source code, the compiler may produce output including error messages, diagnostics, such as warnings or other information describing various aspects of the compilation, and/or executable object code (e.g. an executable program).

Compilers are intended to be used frequently and are critical to the software development process. Accordingly, the integrity of compilers must continuously be maintained and verified to ensure that the compiler implementation conforms to the source language's specifications, the compiler generates accurate object code, and ultimately that the compiler generates properly functioning executable programs. Thus, compilers are constantly being tested to isolate and identify any bugs and/or logical errors that may exist.

Conventional testing methodologies, however, may be both limited in analysis and time-consuming. Compilers are continuously being maintained, modified, and/or upgraded to support the expanding functionality of programming languages and the increasing complexity of computer architectures. Conventional testing methods may fail to identify unintended behavioral changes that were inadvertently introduced with various modifications made to the compiler over time. Accordingly, as compilers become increasingly complex, more sophisticated testing techniques are needed. It is with these observations in mind, among others, that various aspects of the present disclosure were developed.

SUMMARY

Aspects of the present disclosure include a method for performing feedback-driven regression testing of a compiler. The method may be performed by a processor, such as a processor located within a computing device. Specifically, the method includes compiling a code corpus comprising a plurality of test programs corresponding to a particular programming language. The method also includes compiling the code corpus using a first version of a compiler to generate first compiler output. Additionally, the method includes compiling the code corpus using a second version of a compiler to generate second compiler output. The method includes retrieving tests corresponding to the first compiler output and the second compiler output. The method further includes executing tests to generate a regression result for the second version of the compiler. The regression result may be used to identify whether behavioral regressions were introduced in the second version of the compiler.

Aspects of the present disclosure also include systems for performing feedback-driven regression testing of a compiler. The system includes a database. The system also includes a processor in operable communication with the database capable of executing one or more instructions to perform feedback-driven regression testing of on a compiler. The processor is configured to compile a code corpus comprising a plurality of test programs corresponding to a particular programming language. The processor is also configured to compile the code corpus using a first version of the compiler to generate first compiler output. Furthermore, the processor is configured to compile the code corpus using a second version of a compiler to generate second compiler output. The processor is configured to retrieve tests corresponding to the first compiler output and the second compiler output and execute the tests to generate a regression result for the second version of the compiler. The regression result may be used to identify whether behavioral regressions were introduced in the second version of the compiler.

Aspects of the present disclosure include non-transitory computer readable mediums encoded with a regression application that when executed may perform feedback-driven regression testing of a compiler. The regression application includes modules executable by a processor. The modules include an execution module to compile a code corpus comprising a plurality of test programs corresponding to a particular programming language. The execution module is further configured to compile the code corpus using a first version of a compiler to generate first compiler output and compile the code corpus using a second version of a compiler to generate second compiler output. Additionally, the modules include an analysis module to retrieve tests corresponding to the first compiler output and the second compiler output. The analysis module is further configured to execute the tests to generate a regression result for the second version of the compiler. The regression result may be used to identify whether behavioral regressions were introduced in the second version of the compiler.

BRIEF DESCRIPTION OF THE DRAWINGS

The foregoing and other objects, features, and advantages of the present disclosure set forth herein will be apparent from the following description of exemplary embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only exemplary embodiments of the present disclosure and, therefore, are not to be considered limiting in scope.

DETAILED DESCRIPTION

Figure 1:
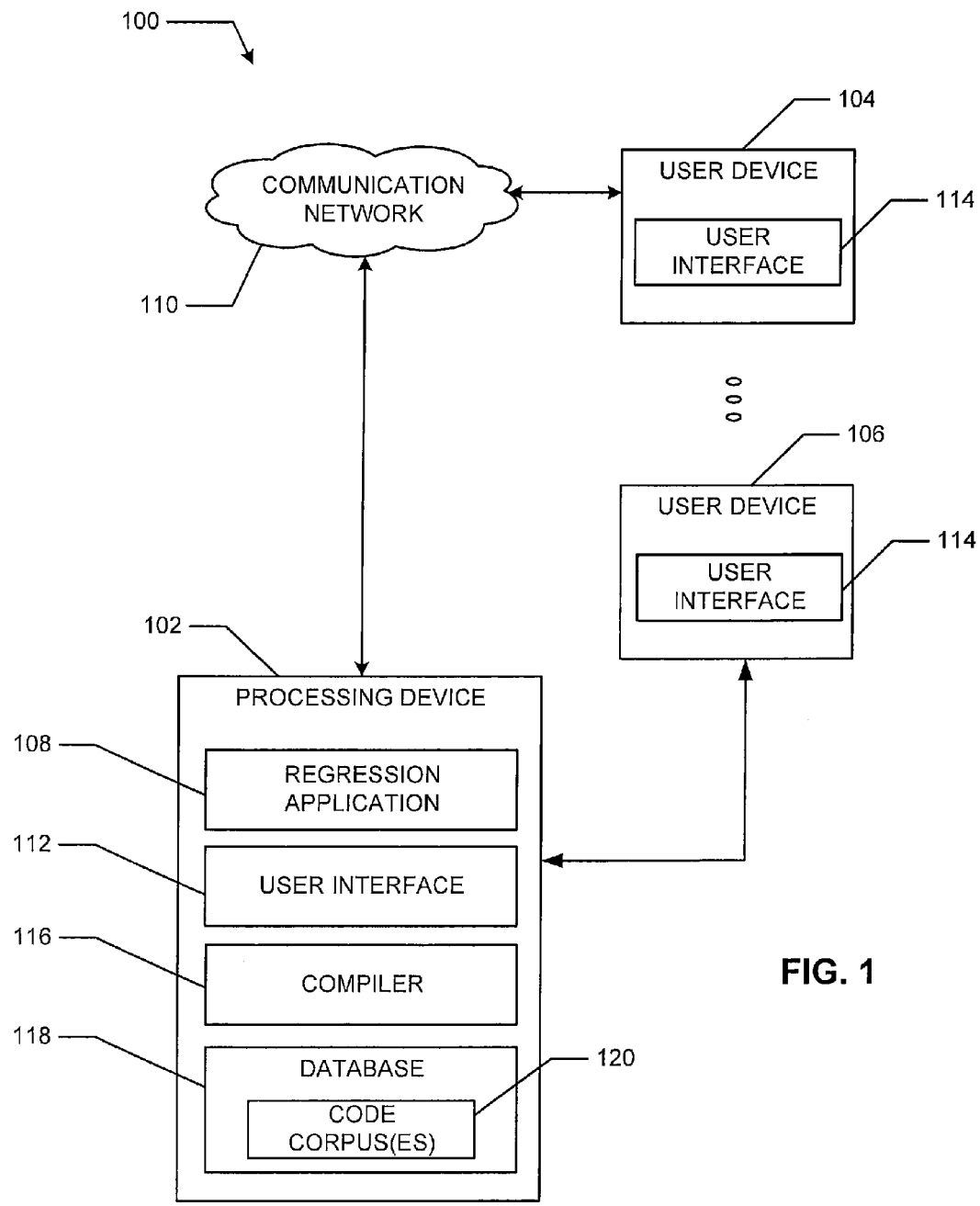
FIG. 1 is a block diagram illustrating a computing environment for performing feedback driven regression testing for a compiler, according to aspects of the present disclosure.

Aspects of the present disclosure provide methods and systems for performing feedback-driven regression testing of a compiler. In various aspects, a compiler is tested using a code corpus to identify behavioral regressions that may have been inadvertently introduced through modifications made to the compiler, such as during maintenance, or when implementing feature enhancements. A code corpus, as will be further described below, includes a large body of code corresponding to a particular programming language, which when compiled by a compiler will cause the compiler to make numerous, different and distinct, internal decisions. The code corpus may include code representative of type of code typically written in the particular programming language to which the code corpus corresponds.

A behavioral regression represents an unexpected or unforeseen change in the compiler that causes the compiler to behave in some unexpected manner. Typically, the behavior regression is introduced by modifications made to the compiler's implementation, such as the addition of new features. In some instances, the result of a behavioral regression may be visible, such as when a program that previously compiled successfully is rejected (i.e. compiled unsuccessfully after the compiler was modified) as a result of an unwanted behavioral change to the compiler. Alternatively, the result of a behavioral regression may be less visible, such as when the difference in the behavior of the compiler does not affect the success or failure of the compilation process, but only the internal decisions made during compilation (and hence the behavior of the generated object code). Invisible behavioral regressions may cause serious problems, as the compiler may have introduced subtle differences in the generated executable program that cause the program to execute in a different manner than the executable program would have executed when compiled with an earlier version of the compiler.

The code corpus is compiled using multiple and diverse versions of a compiler and the internal decisions made by each respective version of the compiler are recorded. For example, in one aspect, an original compiler may be used to compile a code corpus and the output generated from the compilation may be recorded. Subsequently, the original compiler may be modified, creating a new version of the compiler. The same code corpus that was compiled by the original version of the compiler may be compiled using the modified version of the compiler. The output generated from the modified version of the compiler is recorded and compared to the known results from compiling the code corpus using the original version. Thus, a series of compiler versions derived from an original version of the compiler may be tested to ensure each respective version is behaving like the original version.

In order to properly record output generated by the compiler, each respective version of the compiler may be equipped with various functionalities and/or or otherwise be instrumented to generate output articulating the internal decisions that the compiler may make during compilation. The output may be generated in the form of artifacts, heuristics, log files, objects, diagnostics, etc. Those skilled in the art would understand various methods for instrumenting a compiler. For example, various methods for instrumenting a compiler are described in co-pending non-provisional utility application Ser. No. 13/562,915 titled "Systems And Methods For Testing A Compiler Through Compile-Time Decision Feedback," which is fully incorporated by reference in its entirety herein. Once the internal decisions made by each version of the compiler have been recorded, the internal decisions for each compiler version may be compared and/or otherwise analyzed to verify that the differences (e.g. feature enhancements or maintenance modifications) between the different versions of the compiler have not introduced any unanticipated behavioral regressions.

Generally, when a compiler is modified, such as by adding new functionality, it is common practice to execute the new version of the compiler using the same test code that was used to validate an earlier version of the compiler to check whether the modifications to the compiler introduced any behavioral regressions. Although such testing methodologies may be effective in identifying some errors related to the modifications made to the compiler, such testing methods may be limited by the quality or coverage of the existing test code. In particular, since most test codes only target a small portion of the compiler's functionality for testing, using the same test code to test the different version of a compiler will only effectively test the different version of the compiler with respect to the same limited functionality, and therefore, may miss behavioral regressions, such as subtle behavioral regressions, related to other functionality of the compiler, which were inadvertently caused by the modifications. Stated differently, compilers may face various testing challenges in comparison to other applications, such as web applications, because programming languages have a combinatorial explosion of interacting features, which makes obtaining and/or otherwise generating quality tests and test coverage more challenging than with respect to other types of applications.

Performing feedback-driven regression testing on a compiler using a code corpus addresses such issues. In particular, testing various versions of a compiler using a code corpus that represents a large body of real-world code effectively ensures that a larger portion of the functionality of each version of the compiler is being tested, causing more output describing the internal decisions made by each version of the compiler to be recorded. Additionally, using a large code corpus identifies more decisions and interactions made by the compiler. In particular, performing tests using various combinations of the internal decisions made by the compiler facilitates a finer-grained analysis for determining whether the compiler behaved as intended (rather than just determining whether the compiler compiled successfully). Subsequently, such output may be analyzed to identify behavioral regressions, and ultimately determine how changes made to the compiler in each version of the compiler may have affected the compiler's behavior.

FIG. 1 illustrates an example computing environment 100 for performing feedback-driven regression testing of a compiler, in accordance with aspects of the present disclosure. A processing device 102 and/or user devices 104-106 may include various hardware and accompanying software computing components that may be configured for performing feedback-driven regression testing to test one or more versions of a compiler.

According to one aspect, the processing device 102 may include a compiler 116 capable of compiling one or more code corpuses 120. A compiler is a type of computer program (or set of programs) that transforms source code written in a programming language (the source language) into another computer language (the target language) to create executable programs that will run accurately on some form of computing device. During compilation of the source code, the compiler may produce output including error messages, diagnostics, such as warnings or other information describing various aspects of the compilation, and/or executable object code (e.g. an executable program).

One or more versions of the compiler 116 may be executed to compile the code corpuses 120. During compilation of the code corpuses 120, various outputs generated by each version of the compiler 116 used during compilation of the code corpus 120 may be captured and/or otherwise obtained by a regression application 108 to identify potential behavioral regressions that may have been introduced between the various versions of the compiler 116. For example, the processing device 102 may execute a regression application 108 to invoke a first version of a compiler 116 to compile a code corpus and record output articulating all of the various internal decisions made during compilation. The regression application 108 may compile the same code corpus using a second version of the compiler 116 and record output articulating all of the various internal decisions made during compilation. The output generated by the first version of compiler 116 is compared to the output generated by the second version of the compiler 116 and if a difference exists, the difference is identified as a behavioral regression. Thus, the regression application 108 processes the output of each respective versions of compiler 116 to determine whether or not the compiler is behaving according to its original specifications. The, the regression application 108 may be located on the processing device 102 and/or on the user devices 104-106, or elsewhere.

The processing device 102 and/or the user devices 104-106 may be a personal computer, work station, server, mobile device, mobile phone, processor, and/or other processing device. Each device may include one or more processors that process software or other machine-readable instructions and may include a memory to store the software or other machine-readable instructions and data. The memory may include volatile and/or non-volatile memory. Additionally, each device may also include a communication system to communicate via a wireline and/or wireless communications, such as through the Internet, an intranet, and Ethernet network, a wireline network, a wireless network, and/or another communication network. The processing device 102 and/or the user devices 104-106 may further include a display (not shown) for viewing data, such as a computer monitor, and an input device (not shown), such as a keyboard or a pointing device (e.g., a mouse, trackball, pen, touch pad, or other device) for entering data and navigating through data, including exams, images, documents, structured data, unstructured data, HTML pages, other web pages, and other data.

According to one aspect, the processing device 102 and/or the user devices 104-106 may include a user-interface (UI) 112 and 114 to receive input from a user to perform feedback-driven regression testing. UIs 112 and 114 may include a display (not shown) such as a computer monitor, liquid crystal display, for viewing data and/or input forms, and any combination of input/output devices (not shown), such as a keyboard, or a pointing device (e.g., a mouse, trackball, pen, or touch pad), speaker, and/or any other type of device. A user, such as a programmer, may access user devices 104-106 (e.g. via UIs 114) to provide input and/or receive and/or access output related to the internal decisions made by one or more versions of the compiler 116.

The user devices 104-106 may communicate with the processing device 102 through a communication network 110, which may be the Internet, an intranet, a local area network, a wireless local network, a wide area network, or another communication network, as well as combinations of networks. For example, the user devices 104-106 may communicate with the processing device 102 through a private network to perform automatic testing. In another aspect, the user devices 104-106 may communicate with the processing device 102 directly such as through an Ethernet connection.

While aspects of the present disclosure have been described as being performed using multiple devices within a computing environment, such as computing environment 100 shown in FIG. 1, it is contemplated that such aspects may be performed locally, using only a single device, such as the processing device 102 and in such cases the user device is integrated to or otherwise in direct connection with the processing device 102.

Figure 2:
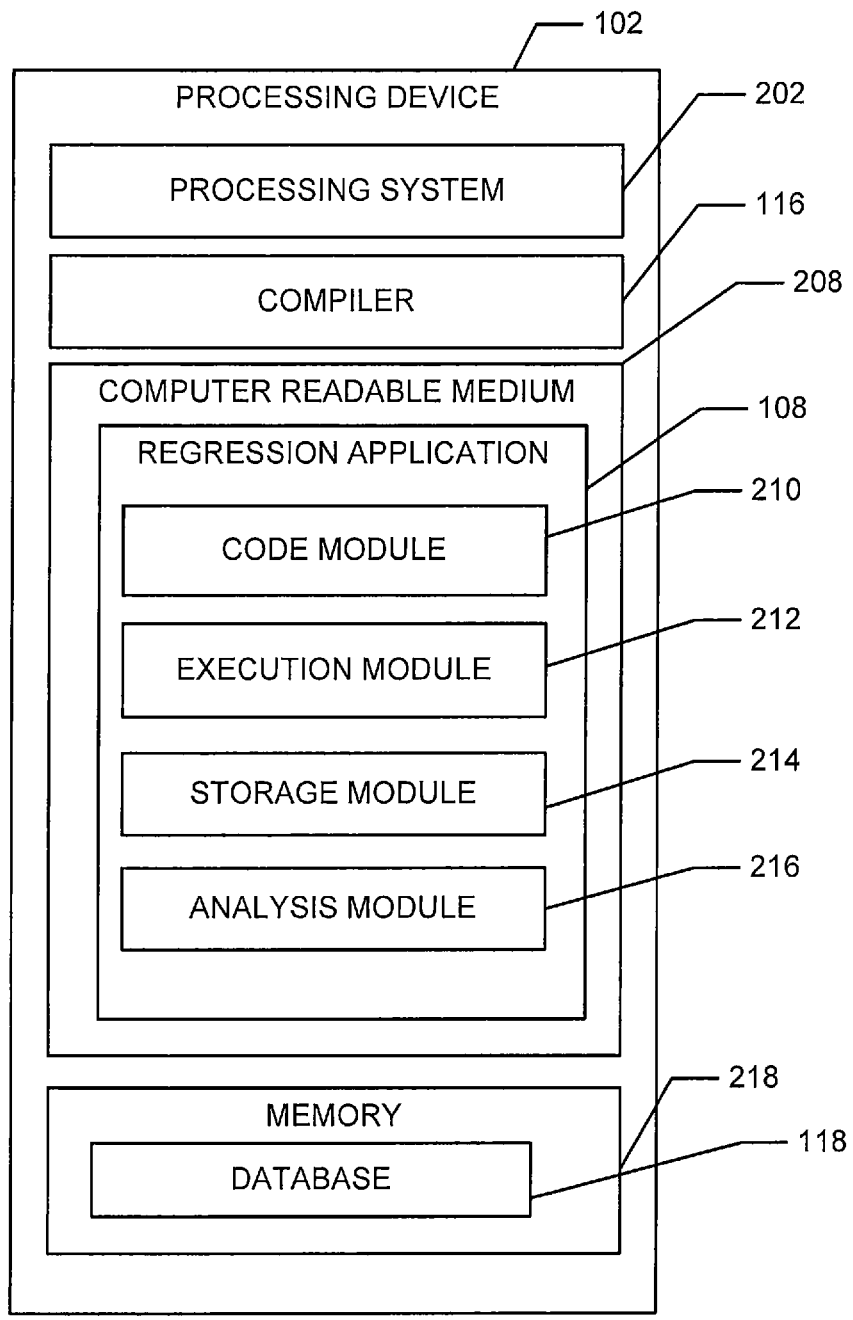
FIG. 2 is a block diagram illustrating a processing device, according to aspects of the present disclosure.

FIG. 2 is an example block diagram illustrating the various hardware and/or software components of the processing device 102 according to one exemplary embodiment of the present disclosure. The processing device 102 may include one or more processors and/or a processing system 202 that may be used to execute the regression application 108 that may perform feedback-driven regression testing of a compiler by automatically comparing the various internal decisions made by one or more versions of a compiler, such as the compiler 116.

The one or more processors and/or processing system 202 may include memory and/or be in communication with a memory 218, which may include volatile and/or non-volatile memory. The one or more processors and/or processing system 202 may also include various other computing components. The processing device 102 may include a database 118. The database 118 may be a general repository of data including program source code data, compilation data, test data, compiler internal decision data and/or any other data relating to compilation, the compilation of source code, and/or the testing, analyzing, and comparing of internal decisions made during the execution of multiple versions of a compiler. In one particular embodiment, the database 118 may include one or more code corpuses 120 (not shown). The database 118 may include memory and one or more processors or processing systems to receive, process, query and transmit communications and store and retrieve such data. In another aspect, the database 118 may be a database server.

The processing device 102 may include one or more versions of a compiler 116. In one aspect, the processing device may include a baseline version of the compiler 116, which represents the original version of the compiler that has been properly tested and is currently behaving as designed and according to its specifications. For example, the processing device 102 may include a baseline Java® compiler that generates Java® code for execution with a Java® virtual machine. The processing device 102 may also include different versions of the baseline compiler 116, such as versions including various functional upgrades, versions including new compiler features, and versions that have been modified for routine maintenance, etc. Any type of implementation details capable of causing the compiler to make different internal decisions may qualify as a different version of the compiler. For example, the processing device 102 may include a version of the Java® compiler that has been modified to include new compiler functionality in comparison to the baseline Java® compiler.

The processing device 102 may include a computer readable media ("CRM") 208, which may include computer storage media, communication media, and/or another available computer readable media medium that can be accessed by the one or more processors and/or processing system 202. For example, CRM 208 may include non-transient computer storage media and communication media. By way of example and not limitation, computer storage media includes memory, volatile media, nonvolatile media, removable media, and/or non-removable media implemented in a method or technology for storage of information, such as machine/computer readable/executable instructions, data structures, program modules, or other data. Communication media includes machine/computer readable/executable instructions, data structures, program modules, or other data.

The CRM 208 may store executable instructions to implement the regression application 108 and/or associated functions, processes, modules, etc. Generally, program modules include routines, programs, instructions, objects, components, data structures, etc., that perform particular tasks or implement particular abstract data types. The processing system 202 may launch, run, execute, interpret or otherwise perform the logical instructions and/or processes of the regression application 108 to perform feedback-driven regression testing for a compiler, such as process 300 illustrated in FIG. 3, which depicts an example method and/or process for feedback-driven regression testing on various versions of a compiler.

Figure 3:
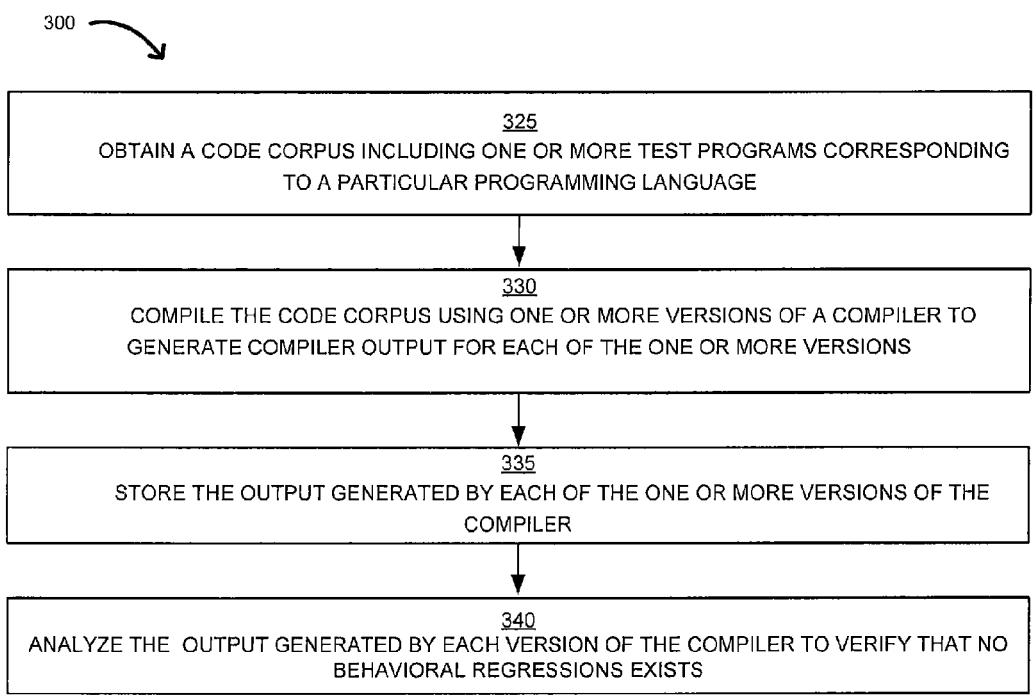
FIG. 3 is a flowchart illustrating an example processes for performing feedback driven regression testing for a compiler, according to aspects of the present disclosure.

Referring to FIG. 3, initially, at 325, process 300 includes obtaining a code corpus for that includes real-world source code and/or one or more real-world programs corresponding to a particular programming language. For example, as shown in FIG. 2, a code module 210 may obtain and/or receive test code to be executed or otherwise compiled by a compiler for regression testing. In particular, the code module 210 may obtain, receive, and/or otherwise access a code corpus, which includes test programs, test code, test files, and/or source code representative of the various syntaxes, language implementations, logics, semantics, algorithms, functionalities etc., of a particular programming language that may be compiled or otherwise interpreted by a compiler. The code corpus represents a large body of test programs and/or test cases corresponding to a particular programming language that when compiled is capable of testing a large percentage of the various functionalities of a compiler, including any functionalities of the compiler that may have been modified. For example, the code corpus may include lines, portions, and/or sections of code from available open source code, internal product source code, machine-generated code, etc. for a particular programming language, may be curated, and may be a large body of code (e.g., may include anywhere from tens of millions of lines of code to hundreds of millions of lines of code). In one exemplary embodiment, the code corpus may include hundred million lines of curated Java® code. In another example, the code corpus may be a set of Java® programs. It is contemplated that multiple, different code corpuses may be obtained or accessed, such a representative code corpus for Java® code and a different representative code corpus for C code.

Referring again to FIG. 3, at 330, the code corpus is compiled by one or more versions of a compiler to generate compiler output corresponding to each version of the compiler. As illustrated in FIG. 2, an execution module 212 may execute multiple versions of a compiler to compile the code corpus and generate output illustrating, describing, and/or otherwise articulating a reconstruction of the various internal decisions made by each version of the compiler. Additionally, various other outputs, such as object files, error messages, and/or compiler diagnostics, may be generated and/or otherwise obtained. In one particular embodiment, the compiler may be instrumented and/or implemented to generate, produce, expose or provide compile-time internal decisions and/or decision data that describing the various internal decisions made by the compiler during execution. Stated differently, the compiler may be functionally altered to produce data describing each internal decision made by the compiler while compiling test code, such as the code corpus obtained by the code module 210. Decision data includes data, compilation metadata, output, and/or information describing the various internal decisions made by the compiler during compilation and any associated information describing and/or otherwise evidencing the reason a particular internal decision was made.

For example, the compiler may be instrumented to generate decision data exposing the internal decisions made by the compiler when making type-inference decisions, or when performing method overload resolution. The output generated from executing each version of the compiler may be saved in the database 118.

To illustrate some of the inventive concepts discussed herein, consider the example of the execution module 212 compiling a code corpus using two different versions of a compiler D. Version 1 of the compiler D may be the baseline or original version and version 2 may include and/or implement various feature enhancements that cause the D compiler to run more efficiently. Both versions of the compiler are instrumented to generate decision data describing the internal decisions they make when compiling code. The execution module 212 may compile a code corpus accessed by the code module 210 using version 1 of the compiler to generate decision data, or a first set of internal decisions made by version 1 of the compiler while executing. Subsequently, the execution module may compile the same code corpus using version 2 of the compiler (which has at least one implementation modification different than the version 1 compiler) to generate decision data including a second set of internal decisions corresponding to the version 2 compiler. While only two different versions of a compiler have been described above, it is contemplated that any number of different or unique versions of a compiler may be executed by the execution module 212 to generate corresponding sets of decision data representing the various internal decisions made during compilation.

Referring back to FIG. 3, the output generated during compilation of the code corpus for each version of the compiler is stored at 335. A storage module 214 of FIG. 2 may associate the output (e.g. decision data) generated by the various versions of a compiler executed by the execution module 212, associating the output with a particular code corpus, a particular position being compiled, and store the output in a persistent manner in the database 118. For example, the output may be stored as a data record in a database indexed by the date of compilation, the particular code corpus that was compiled, the line and position at which a particular decision was made within the particular source code, the particular type of the decision, and the result. Turning to the example above, the decision data generated by version 1 of the compiler may be stored in the database as a data record, such as in the database 118. For example, the decision data may be stored or recorded as one or more rows and corresponding columns within a database. Each row may represent and/or otherwise include decision data corresponding to a single compilation version of the compiler. Each row may include one or more columns and each column may represent a set of data values corresponding to a particular row. Thus, for each row representing a different version of the compiler various decision data values may be stored. In particular, the decision data may be recorded in a database row including one or more columns for storing data values corresponding to: project, source file/test program, specific line of code at which the decision data was generated, diagnostic information, and/or compilation metadata. Compilation metadata refers to data and/or information about one or more aspects of the compilation. For example, compilation metadata may include information such as: the means of creation of the data, the purpose of the data, time and date of the compilation, etc. Diagnostic data may include the result of recording an internal decision, such as "for a given method invocation, candidates A, B, and C were considered, and candidate A was chosen for reason X." Other columns and/or data values may also be included. The decision data generated by version 2 of the compiler may also be stored in the database as a data record. Other methods for storing the decision data may also be used. For example, the decision data may be recorded and/or otherwise dumped to a text file.

Referring again to FIG. 3, at 340, the output generated by each version of the compiler is analyzed to verify that no behavioral regressions exist. For example, as shown in FIG. 2, an analysis module 216 may process, parse, and/or analyze the output generated by each version of a compiler executed by the execution module 212 to verify that the each version of the compiler is behaving correctly, and thus, that no behavioral changes or regressions have inadvertently been introduced by modifications represented in the various versions of the compiler. Stated differently, the output generated by compiling the same code corpus using different versions of a compiler may be compared to determine that each specific version of the compiler is behaving in the same manner as a baseline version of the compiler and therefore that no behavioral regressions have been introduced. For example, once all the compiler decisions have been stored (e.g. in database 118) the decisions made by version 1 of the compiler may be compared against those made by compiler by running a query in the database 118.

According to one aspect, the output generated by each specific version of a compiler may be categorized. For example, the output may include or otherwise be categorized as object files (or class files). Alternatively, the output may be categorized as a compiler diagnostic. Diagnostics represent information and/or messages emitted by the compiler during compilation that describes various issues, problems, warnings, etc. that are identified during compilation. Additionally, the diagnostics may provide information such as: the file in which the diagnostic was provided; the specific line and column of the file where the diagnostic occurred; a description of the diagnostic (e.g., "unknown identifier"); and/or supporting information about the diagnostic (e.g., the name of the unknown identifier). Different versions of the compiler may generate one or more of such diagnostics. In one particular embodiment, if the compiler has been instrumented, the decision data may be categorized based on the various internal decisions described in the decision data generated by the instrumented compiler. For example, the decision data may include internal decisions that may be categorized as: method invocations decisions; type inference decisions; expression decisions; optimization decisions, such as identifying whether a compiler can perform constant folding common sub expression elimination or code hoisting, etc. Once output generated by each version of the compiler has been categorized the categorized output may be analyzed to identify a common category between among the output generated by the various versions of the compiler.

Each category of output lends itself to a specific testing scenario. A testing scenario represents a test file and/or articulation of one or more assertions describing the limits of acceptable changes between the outputs generated by the various versions of the compiler. For example, an example assertion may be "if diagnostic X is present in the output of a first compilation run at a given position in a source file, then a version of diagnostic X must be present in the output of the second compilation for the same source file and position."

In one embodiment, the analysis module 216 may process the output generated by a particular version of the compiler to perform a success/failure test. Specifically, the analysis module 216 may, for example, compare the output generated when compiling a code corpus A, including one or more test files, that compiled successfully by compiler D against the output generated when compiling the same code corpus A by a different version of compiler D to determine that all the same files within the code corpus A compiled successfully in both the original and different version of compiler D. Alternatively, the analysis module 216 may, for example, compare the output generated when compiling the code corpus A, including one or more test files, that compiled successfully by compiler D against the output generated when compiling the same code corpus A by a different version of compiler D to determine that all the same files within the code corpus A failed in both the original and different version of compiler D. Such a test may ensure that behavioral regressions were not introduced between the one or more tested versions of the compiler.

As another example, the analysis module 216 may process the output generated by the various versions of the compiler and identify one or more object files generated by one or more versions of the compiler. Subsequently, the analysis module 216 may determine whether each respective version of the compiler produced identical object files. For example, for every object file generated by compiling test cases by one or more versions of the compiler, the analysis module 216 may analyze the object files to determine whether the files are "identical" (The term identical used in this context often does not necessarily indicate that different compiler versions generate identical code byte-for-byte, because sometimes object files contain extra information such as the time at which the compilation occurred, or other information about the compilation environment). Such a test would verify that any compiler changes and/or modifications did not cause any behavioral regressions in the resulting object code.

In another example, the analysis module 216 may process the output generated by multiple versions of the compiler to perform an identical diagnostics test. Thus, for every diagnostic produced by the original compiler D when compiling the code corpus A, the analysis module 216 may verify that a corresponding diagnostic was produced by the different modified version of compiler D. For example, the diagnostic may be verified by determining that the file information, position information, and diagnostic information are identical. Alternatively, the analysis module 216 may process the output generated by various versions of the compiler to perform a no new diagnostics test, where for every diagnostic produced by the original version of the compiler D when compiling the code corpus A, the analysis module 216 ensures that no new diagnostics where produced by the different version of the compiler D.

In another example, if the compiler is instrumented and thus capable of producing decision data including one or more internal decisions, the analysis module 216 may compare the decision data generated by an original version of the compiler with decision generated by a different version of the compiler to by verifying that one internal decision in the decision data generated by the original version of the compiler corresponds to an internal decision generated by the different version of the compiler. If a difference exists, the difference is identified as a behavioral regression. Stated differently, if a different internal decision articulated in the decision data generated by the different version of the compiler is distinct and different from all of the internal decisions articulated in the decision data generated by the baseline compiler, then a behavior regression exists, and is represented by the distinct and different internal decision.

Alternatively, the analysis module 216 may process the decision data based on the kind of internal decisions identified within the decision data, such as selecting a specific method to invoke among several candidates, inferring the type of a variable, evaluating the type of an expression, etc. For example, the decision data may include internal decisions of the kind related to the invocation of a method/method call. Thus, the analysis module 216 may analyze the internal decisions of an instrumented original compiler D and compare the decisions against the internal decisions of the different modified version of the compiler D to ensure that the modified version of the compiler D did not make any different internal decisions regarding any other kind but those decisions relating to the invocation of a method/method call.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various exemplary embodiments, it will be understood that these embodiments are illustrative and that the scope of the disclosure is not limited to them. Many variations, modifications, additions, and improvements are possible. More generally, embodiments in accordance with the present disclosure have been described in the context of exemplary implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for testing a compiler comprising:
   compiling a code corpus comprising a plurality of test programs corresponding to a particular programming language, the code corpus being compiled by a first version of a compiler to generate first compiler output;
   compiling the code corpus using a second version of the compiler to generate second compiler output, the second version of the compiler including different functionality than the first version of the compiler;
   retrieving, by one or more computing devices, at least one test corresponding to the first compiler output and the second compiler output; and
   executing, by the one or more computing devices, the at least one test to generate a regression result for the second version of the compiler.

2. The method of claim 1, wherein the regression result verifies that no regressions exist in the second version of the compiler.

3. The method of claim 1, wherein the first compiler output comprises a plurality of first internal decisions made by the first version of the compiler, the second compiler output comprises a plurality of second internal decisions made by the second version of the compiler, and wherein executing the at least one test comprises comparing the first plurality of internal decisions with the second plurality of internal decisions to verify that all of the first plurality of internal decisions corresponds to all of the second plurality of internal decisions.

4. The method of claim 1, wherein the first compiler output comprises a plurality of first internal decisions made by the first version of the compiler, the second compiler output comprises a plurality of second internal decisions made by the second version of the compiler, and wherein executing the at least one test comprises:
   identifying a particular kind of decision based on the plurality of first internal decisions; and
   verifying that each decision of the plurality of second internal decisions corresponds to a particular decision of the plurality of first internal decisions and the particular kind.

5. The method of claim 1, wherein the first compiler output is a first object file, the second compiler output is a second object file, and wherein executing the at least one test comprises determining whether the first object file is identical to the second object file.

6. The method of claim 1, wherein the first compiler output comprises a plurality of first internal decisions made by the first version of the compiler and wherein the second compiler output comprises a plurality of second internal decisions made by the second version of the compiler, the method further comprising:
   associating the plurality of first internal decisions and the plurality of second internal decisions with a particular test program of the plurality of test programs; and
   storing the associated plurality of first internal decisions and the associated plurality of second internal decisions in a data record.

7. The method of claim 1, wherein the code corpus comprises a plurality of Java® program source files.

8. A system for testing a compiler comprising:
   a database; and
   at least one processor in operable communication with the database, the processor to:
      compile a code corpus comprising a plurality of test programs corresponding to a particular programming language, the code corpus being compiled by a first version of a compiler to generate first compiler output;
      compile the code corpus using a second version of the compiler to generate second compiler output, the second version of the compiler including different functionality than the first version of the compiler;

retrieve at least one test corresponding to the first compiler output and the second compiler output; and execute the at least one test to generate a regression result for the second version of the compiler.

9. The system of claim 8, wherein the regression result identifies a regression in the second version of the compiler.

10. The system of claim 8, wherein the first compiler output comprises a plurality of first internal decisions made by the first version of the compiler, the second compiler output comprises a plurality of second internal decisions made by the second version of the compiler, and wherein to execute the at least one test comprises comparing the first plurality of internal decisions with the second plurality of internal decisions to verify that all of the first plurality of internal decisions corresponds to all of the second plurality of internal decisions.

11. The system of claim 8, wherein the first compiler output comprises a plurality of first internal decisions made by the first version of the compiler, the second compiler output comprises a plurality of second internal decisions made by the second version of the compiler, and wherein to execute the at least one test comprises:
 identifying a particular kind of decision based on the plurality of first internal decisions; and
 verifying that each decision of the plurality of second internal decisions corresponds to a particular decision of the plurality of first internal decisions and the particular kind.

12. The system of claim 8, the first compiler output is a first object file, the second compiler output is a second object file, and wherein to execute the at least one test comprises determining whether the first object file is identical to the second object file.

13. The system of claim 8, wherein the first compiler output comprises a plurality of first internal decisions made by the first version of the compiler and wherein the second compiler output comprises a plurality of second internal decisions made by the second version of the compiler and wherein the processor is further configured to:
 associate the plurality of first internal decisions and the plurality of second internal decisions with a particular test program of the plurality of test programs; and
 store the associated plurality of first internal decisions and the associated plurality of second internal decisions in a data record.

14. The system of claim 8, wherein the code corpus comprises a plurality of Java® program source files.

15. A non-transitory computer readable storage medium comprising a regression application comprising modules executable by a processor, the modules comprising:
 an execution module to:
  compile a code corpus comprising a plurality of test programs corresponding to a particular programming language, the code corpus being compiled by a first version of the compiler to generate first compiler output; and
  compile the code corpus using a second version of the compiler to generate second compiler output, the second version of the compiler including different functionality than the first version of the compiler; and
 an analysis module to:
  retrieve at least one test corresponding to the first compiler output and the second compiler output; and
  execute the at least one test to generate a regression result for the second version of the compiler.

16. The non-transitory computer readable storage medium of claim 15, wherein the first compiler output comprises a plurality of first internal decisions made by the first version of the compiler, the second compiler output comprises a plurality of second internal decisions made by the second version of the compiler, and wherein to execute the at least one test comprises comparing the first plurality of internal decisions with the second plurality of internal decisions to verify that all of the first plurality of internal decisions corresponds to all of the second plurality of internal decisions.

17. The non-transitory computer readable storage medium of claim 15, wherein the first compiler output comprises a plurality of first internal decisions made by the first version of the compiler, the second compiler output comprises a plurality of second internal decisions made by the second version of the compiler, and wherein to execute the at least one test comprises:
 identifying a particular kind of decision based on the plurality of first internal decisions; and
 verifying that each decision of the plurality of second internal decisions corresponds to a particular decision of the plurality of first internal decisions and the particular kind.

18. The non-transitory computer readable storage medium of claim 15, wherein the first compiler output is a first object file, the second compiler output is a second object file, and wherein to execute the at least one test comprises determining whether the first object file is identical to the second object file.

19. The non-transitory computer readable storage medium of claim 15, wherein the first compiler output comprises a plurality of first internal decisions made by the first version of the compiler and wherein the second compiler output comprises a plurality of second internal decisions made by the second version of the compiler, the non-transitory computer readable medium further comprising a storage module to:
 associate the plurality of first internal decisions and the plurality of second internal decisions with a particular test program of the plurality of test programs; and
 store the associated plurality of first internal decisions and the associated plurality of second internal decisions in a data record.

20. The non-transitory computer readable storage medium of claim 15, wherein the code corpus comprises a plurality of Java® program source files.

* * * * *

UNITED STATES PATENT AND TRADEMARK OFFICE
CERTIFICATE OF CORRECTION

| | | |
|---|---|---|
| PATENT NO. | : 8,930,765 B2 | Page 1 of 1 |
| APPLICATION NO. | : 13/563026 | |
| DATED | : January 6, 2015 | |
| INVENTOR(S) | : Goetz et al. | |

It is certified that error appears in the above-identified patent and that said Letters Patent is hereby corrected as shown below:

On the Title Page

Column 2, item (57) under Abstract, line 2, delete "of are" and insert -- are --, therefor.

Signed and Sealed this
Eighth Day of September, 2015

Michelle K. Lee
*Director of the United States Patent and Trademark Office*